Patented Oct. 30, 1951

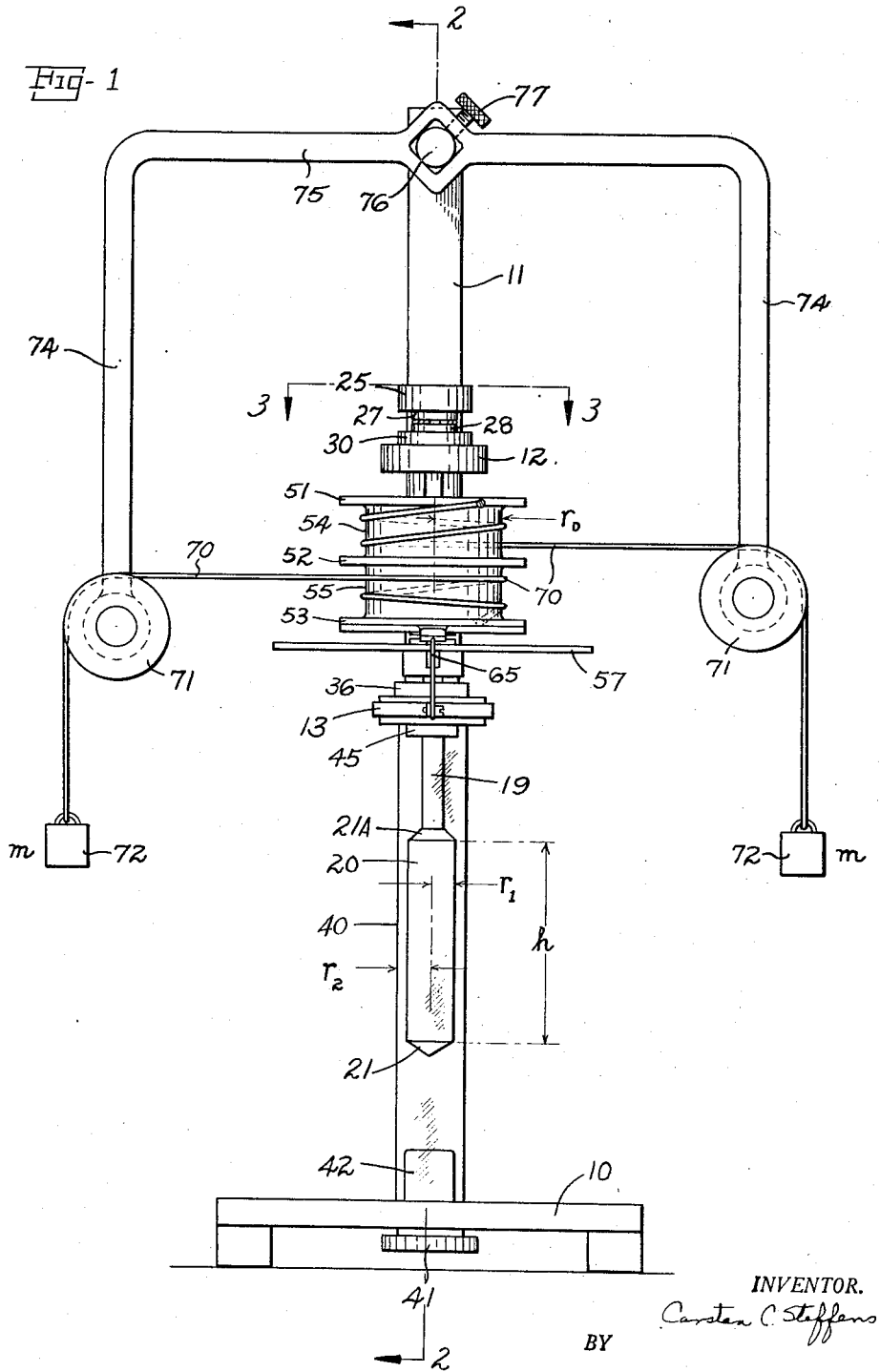

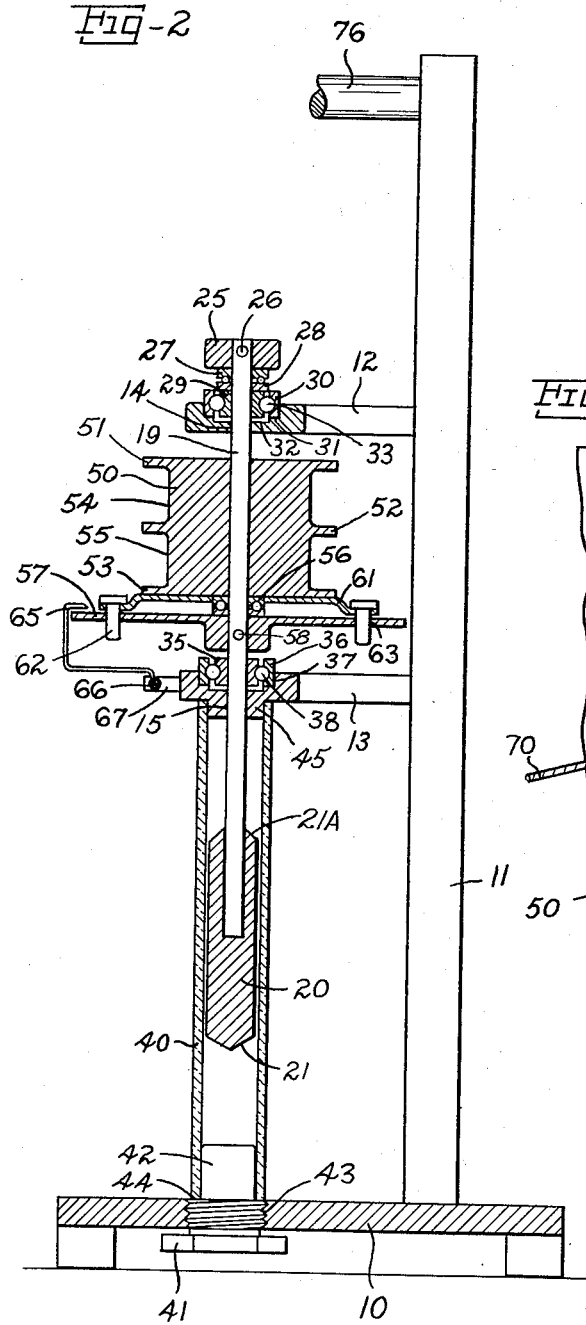
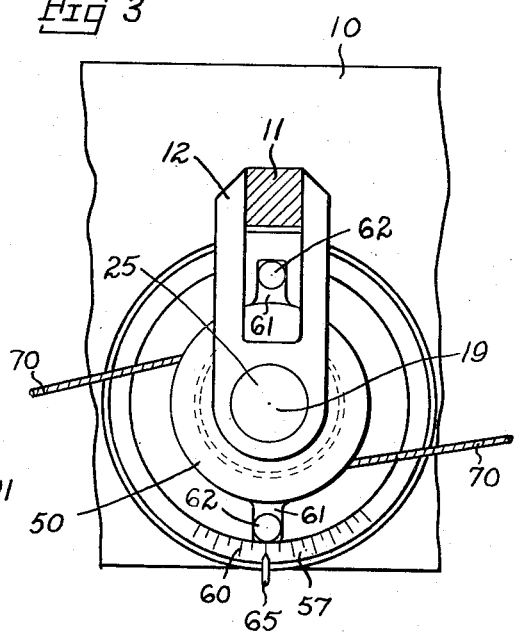

2,573,505

UNITED STATES PATENT OFFICE 2,573,505

VISCOSIMETER

Carsten C. Steffens, Syracuse, N. Y., assignor to Sun Chemical Corporation, New York, N. Y., a corporation of Delaware Application May 31, 1946, Serial No. 673,550

4 Claims. (Cl. 73—59)

This invention relates to viscosity testing apparatus, and more particularly to a viscosimeter of the rotation type.

One of the principal objects of the present invention is to provide a rotation viscosimeter which will give precise results when used for measuring heavy composite materials such as plastics or materials such as printing inks which contain pigments or other solid matter in suspension.

Another object is to provide a rotation viscosimeter which will give results sufficiently accurate that they can be converted substantially directly into absolute units without the use of correction factors.

An additional object is to provide a rotation viscosimeter of such construction that the bearings or other supports for the rotatable member are protected against clogging or other interference by heavy test materials such as printing inks and other suspensions.

It is also an object of the invention to provide such a viscosimeter which may be quickly and readily disassembled for cleaning and reassembled for further test operations.

A further object is to provide a viscosimeter which permits of measurement of the rate of shear for various shearing forces, in the case of relatively viscous material, whether such materials are Newtonian or non-Newtonian in flow properties.

A still further object of the invention is to provide a rotation viscosimeter wherein all supports and guides for the rotatable members are positioned out of contact with the material under test.

A still further object of the invention is to provide a rotation viscosimeter constructed to reduce to a minimum strains on the spindle or other rotatable members capable of producing inaccuracies in the test results.

Other objects and advantages of the invention will be apparent from the following description, the accompanying drawings and the appended claims.

In the drawings, in which like characters of reference designate like parts throughout—

Fig. 1 is a view in front elevation showing a viscosimeter embodying a preferred form of the invention;

Fig. 2 is a side elevation partly in section on the line 2—2 in Fig. 1; and

Fig. 3 is a partial horizontal section taken on the line 3—3 in Fig. 1.

In the preferred embodiment of the invention shown in the drawings, the base 10 of the instrument serves as a support for upright column 11, which in turn is provided with two arm members 12 and 13 parallel to each other and projecting outwardly substantially at right angles to column 11. These arm members 12 and 13 may be formed integrally with column 11 or otherwise secured thereto in rigid alignment. Adjacent their outer ends, arms 12 and 13 are provided with apertures 14 and 15, which are accurately arranged in vertical alignment and are adapted to receive a spindle member 19 having a member 20, shown as cylindrical in shape, secured to the lower end for rotation in the material whose viscosity is under test, and apertures 14 and 15 should be sufficiently greater in diameter than spindle 19 to avoid friction therebetween. This rotatable member or bob 20 and its supporting spindle 19 may be made of relatively heavy materials to provide stability in use, satisfactory results having been obtained, for example, by utilizing $\frac{3}{16}''$ steel rod for spindle 19 and $\frac{7}{16}''$ steel rod for bob 20. As shown, the lower end 21 of bob 20 is of conical shape, for example with a base angle of 30°, and in practice it has been found that this construction reduces end effects on the material under test, which is a factor seriously affecting accuracy when the rotatable cylinder is formed with a plane face. Similarly, the upper end 21A of bob 20 likewise is of conical shape, as indicated.

Fig. 2 shows most clearly the mounting means for spindle 19. A collar 25 is secured to the upper end of the spindle, for example by means of a pin 26 as shown. The lower side of this collar is supported by the upper member 27 of an annular thrust bearing, and the lower member 28 of this bearing is in turn supported by the inner race 29 of a ball bearing having its outer race 30 countersunk in the upper surface of arm 12 coaxially with the opening 14 for spindle 19 through the arm. As shown, the opening in arm 12 for race 30 is formed in two levels, the outer level 31 which supports race 30 being annular and sufficiently higher than the central portion 32 so that inner race 29 is supported from outer race 30 through the balls 33 therebetween. Since also thrust bearing member 28 is of lesser diameter, as shown, than the inner diameter of race 30 and is therefore wholly supported by inner race 29, this provides a mounting for collar 25 and spindle 19 having maximum freedom from friction during rotation of the spindle, and capable of supporting a spindle 19 and cylinder 20 of relatively heavy weight, as noted, without sacrificing accuracy in results.

The lower portion of spindle 19 is supported and guided, as shown, by a ball bearing spaced between the upper and lower ends of the spindle and mounted in the upper surface of arm 13 in a manner similar to the mounting of the upper ball bearing in arm 12. Inner race 35 of this lower ball bearing receives spindle 19 therethrough in sufficiently close engagement to prevent relative motion therebetween at an angle to the spindle axis. Outer race 36 is supported in the outer portion of a stepped aperture 37 in the upper surface of arm 13 coaxial with the hole 15 through this arm. Inner race 35 is thus supported from outer race 36 through balls 38 and thus serves to maintain the spindle in accurate axial alignment with the mounting for its upper end.

A hollow cylinder 40 serves as the container for the material to be tested, and satisfactory results have been obtained by forming this cylinder of "true bore" glass. The bottom of cylinder 40 is provided by a plug member 41, which includes a cylindrical end portion 42 adapted for insertion within cylinder 40, and a portion 43 threaded for engagement in a complementary tapped aperture in base 10. Plug portion 42 should be sufficiently less in diameter than the bore of cylinder 40 for easy interfitting, and the dimensions of the plug portions are such as to leave a peripheral transverse shoulder 44, as shown, intermediate cylindrical portion 42 and threaded portion 43 having an outer diameter substantially equal to the outer diameter of cylinder 40. Shoulder 44 provides support for cylinder 40, and the lower end of the cylinder may be ground for tight sealing engagement with this shoulder portion. With the parts made in these relative dimensions, cylinder 40 may readily be withdrawn or inserted through the hole in base 10 for plug 41 without removing the plug from the container and thus without spilling any of the test material.

The hole in base 10 which receives plug 41 should be in accurately coaxial and vertical alignment with the holes 14 and 15 in arms 12 and 13 in order that cylinder 40 may receive cylinder 20 therein in accurately concentric relation. At its upper end cylinder 40 is adapted to receive a cylindrical boss 45 extending downwardly from the under side of arm 13 concentric with aperture 15 and thus locating cylinder 40 properly with respect to spindle 19. The upper end of cylinder 40 may be ground to provide for sealing engagement with the under surface of arm 13 adjacent projecting portion 45. This construction thus provides for quickly and accurately clamping the container cylinder in fixed position but permits simple and convenient disassembly of the parts for cleaning and exchange of test materials after use by simply unscrewing plug 41 and withdrawing it with cylinder 40 out at the bottom of base 10. The assembly and disassembly operations do not in any way affect any of the moving parts of the device nor the alignment of these moving parts.

Preferred results in operation have been obtained with the relative sizes of cylinders 20 and 40 so chosen as to provide clearance between the adjacent cylinder walls sufficiently small in relation to the length of cylinder 20 so that the effect approaches that of a cylinder of infinite length. For example, with a cylinder 20 constructed as described and of a length of the order of 2", a satisfactory internal diameter for cylinder 40 is approximately from $\frac{1}{3}$" to $\frac{1}{2}$". This construction together with the described conical lower face of cylinder 20 also aids in minimizing the relative effect of the cylinder ends on the measurements observed with the device.

Means are also provided for applying predetermined torque to spindle 19 in order to produce relative rotation of cylinders 20 and 40. As shown, a drum 50 is mounted on spindle 19 between arms 12 and 13 and is provided with cylindrical flange portions 51, 52 and 53 dividing its outer surface into two spool-like portions 54 and 55. This drum 50 is supported for rotation with respect to spindle 19 through a thrust bearing 56 by a disk 57 secured to spindle 19 by means such as pin 58 and provided on its upper surface with peripherally arranged graduations 60, as shown particularly in Fig. 3. This construction provides for free relative rotation of drum 50 and disk 57, and means are also provided for releasably locking these members together. As shown, such means comprise one or more arm members 61 secured to the under side of drum 50 and projecting radially outward therefrom, and each of these arms 61 is adapted to receive a stud 62 adapted for releasable engagement in suitable apertures 63 in disk 57. A pointer 65 or similar indicating device is secured as shown by means of a pin 66 to a projection 67 on arm 13 and is adapted to register with graduations 60 on disk 57 as the latter rotates in the use of the device.

In order to impart rotation to rotatable cylinder 20 and its associated rotatable parts, each of drum portions 54 and 55 has secured thereto a suitable cord 70, such as linen thread or silk fish line, adapted to be wound on the drum and extending tangentially outward therefrom over a pair of pulleys 71 and provided at the outer ends with suitable weights 72. As shown in Fig. 1, a convenient mounting for pulleys 71 is provided by the downwardly extending arm portions 74 of a yoke member 75. This yoke member may be readily supported from upright column 11 by an outwardly extending arm portion 76 positioned above arm 12 and engaging in a suitable aperture at the center of yoke 75, the yoke being fixedly secured to arm 76 by means of a locking screw 77. The mountings for pulleys 71 on arms 74 should be substantially frictionless in order to provide for maximum freedom from friction throughout the moving parts of the device in use.

In the operation of the device, cylindrical container 40 is withdrawn from the position shown in Figs. 1 and 2 and filled to a desired level with the material to be tested, and is then reinserted through the hole in base 10 and secured in place by tightening plug 41. Preferably cylinder 40 is filled to such a height that when secured in position the inner rotatable cylinder 20 will be completely immersed in the material under test, and this portion of the instrument is placed in a constant temperature bath regulated to the desired degree of accuracy, for example ±0.1° C. Drum 50 is then rotated, in clockwise direction as viewed in Fig. 3, to wind cord 70 thereon, and during this winding operation the drum may be disconnected from disk 57 and spindle 19 by withdrawing studs 62. This will leave cylinder 20 stationary during the winding operation and thus leave the material to be tested at rest until the testing operation begins. As shown, the two lengths of cord 70 are wound in drum portions 54 and 55 from opposite sides so that when released they will exert a balanced torque in the same direction upon spindle 19. In testing low viscosity materials a single cord 70 and weight 72 may be used effectively, but for high viscosity materials the use of two weights and cords is preferred. It should also be noted that since drum 50 and disk 57, through which torque is applied to spindle 19, are positioned between the guide bearings, tendency of the torque-applying elements to cause movement of the spindle at an angle to its axis is avoided.

After the winding operation is completed, drum 50 is held stationary, as by supporting weights 72 by suitable means, not shown, and the drum is placed in driving connection with disk 57 by re-insertion of studs 62 in arms 61 and holes 63. The weights 72 at the outer ends of cord 70 are chosen as to magnitude in accordance with the approximate viscosity of the material under test in order that the angular velocity of the rotating cylinder 20 when weights 72 are released will be neither too slow nor too rapid. After the weights are released or the device otherwise set in motion to permit weights 72 to exert torque on drum 50 and spindle 19, the time necessary for the weights to travel a definite distance, as indicated by pointer 65 on scale 60, is measured as by a stop watch, and from this time, the mass of the weights and the dimensions of cylinders 20 and 40, the absolute viscosity of the material under test can be quickly and readily calculated.

From the results as obtained above, both the average rate of shear (D) and the average shearing force (F) may be calculated by means of the following equations, wherein $W_0$ is the angular velocity, $m$ is the mass of weights 72, $r_1$ is the radius of bob 20, $r_2$ is the radius of cylinder 40, and $r_D$ is the radius of drum 50, $h$ is the length of bob 20, all as indicated in Fig. 1 and $g$ is the acceleration due to gravity.

$$D = \frac{W_0 r_1 r_2}{r_2^2 - r_1^2}$$

$$F = \frac{m \cdot g \cdot r_D}{r_1 \cdot r_2 \cdot h}$$

The device of the invention has given particularly satisfactory results for testing materials such as heavy plastics or suspensions such as printing inks wherein a considerable quantity of solid matter is suspended in a liquid carrier. The mounting means for the spindle which carries the rotatable cylinder and the guides for this spindle are wholly outside, as shown, the container 40 for the test material, and thus the material is effectively prevented from clogging or otherwise interfering with the free rotation of the rotating cylinder except as a function of its viscosity. Such clogging has caused serious difficulties and inaccuracies in measuring this type of material with viscosimeters of the prior art type wherein the rotating cylinder was provided with a pivotal support at its lower end. The illustrated construction wherein the supports for the rotating cylinder are wholly outside the container for the material under test also offers material advantages from the standpoint of ease of disassembly and cleaning. Of the rotating mechanism and its associated supports, only the cylinder 20 itself and possibly a portion of the lower part of spindle 19 come in contact with the test material and they may be readily cleaned without disassembly and thus without disturbing the alignment of the device. As also described, cylinder 40 is quickly and easily removed from the device and disassembled from plug 41 for complete cleaning. In operation, the device has been found to run with such high freedom from friction and such accurate alignment that the readings obtained as described may be converted directly into absolute units of viscosity such as poises without the use of correction factors.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A viscosimeter of the character described comprising, in combination, a base, an upright member supported by said base, a pair of arm members projecting laterally from said upright member in spaced and parallel relation, a rotatable member, a shaft secured to said rotatable member and coaxial therewith, bearing means carried by the upper of said arm members for supporting said shaft in vertical position, bearing means carried by the other of said arm members for maintaining the vertical alignment of said shaft, a container for material to be tested, said container being adapted to receive said rotatable member for rotation therein, the inner wall of said container and the outer wall of said rotatable member being of complementary shape, plug means carried by said base and boss means carried by the lower of said arm members for supporting said container in vertical position and accurate concentric and spaced alignment with said rotatable member leaving uniform clearance therebetween adapted to receive the material under test.

2. A viscosimeter of the character described comprising, in combination, a base, an upright member supported by said base, a pair of arm members projecting laterally from said upright member in spaced and parallel relation, a cylindrical rotatable member, a shaft secured to said rotatable member and coaxial therewith, bearing means carried by one of said arm members for supporting said shaft in vertical position, bearing means carried by the other of said arm members for maintaining the vertical alignment of said shaft, a cylindrical container for material to be tested, said container being adapted to receive said rotatable member for rotation therein, a cylindrical member extending downwardly from the lower of said arm members concentric with said shaft and adapted to engage in the upper end of said container to locate said container in accurate concentric alignment with said rotatable member, said base having a hole coaxial with said shaft and rotatable member and adapted to receive said container, and a plug member including a cylindrical end portion adapted to engage in the lower end of said container and a threaded portion adjacent said cylindrical portion and of greater diameter adapted for threaded engagement with said hole in said base to support said container in fixed and accurate concentric alignment with said shaft and rotatable member.

3. A viscosimeter of the character described comprising, in combination, a base, an upright member supported by said base, a pair of arm members projecting laterally from said upright member in spaced and parallel relation, a rotatable member, a shaft secured to said rotatable member and coaxial therewith, bearing means carried by one of said arm members for supporting said shaft in vertical position, bearing means carried by the other of said arm members for maintaining the vertical alignment of said shaft, a container for material to be tested, said container being adapted to receive said rotatable member for rotation therein, plug means carried by said base and boss means carried by the lower of said arm members for supporting said container in vertical position and accurate concentric alignment with said rotatable member, a drum mounted on said shaft between said arm members, means for connecting said drum to said shaft for rotation therewith, a member carried by said upright member and extending outwardly and downwardly in spaced lateral relation with said drum, a pulley pivotally carried by said laterally spaced member substantially opposite said drum, and flexible means adapted for winding on said drum and extending over said pulley providing for the application of torque to said drum to rotate said shaft and rotatable member in said container.

4. A viscosimeter of the character described comprising, in combination, a base, an upright member supported by said base, a pair of arm members projecting laterally from said upright member in spaced and parallel relation, a rotatable member, a shaft secured to said rotatable member and coaxial therewith, bearing means carried by one of said arm members for supporting said shaft in vertical position, bearing means carried by the other of said arm members for maintaining the vertical alignment of said shaft, a container for material to be tested, said container being adapted to receive said rotatable member for rotation therein, a drum mounted on said shaft between said arm members, a disk secured to said shaft adjacent said drum and provided with indicia means index means carried by one of said arm members to cooperate with said indicia means for measuring rotational movement of said shaft, means for securing said drum to said disk for rotation with said shaft, a yoke member supported by said upright member and including arm portions extending downwardly in spaced lateral relation with said shaft, pulleys pivotally mounted on said yoke arm portions substantially opposite said drum and on opposite sides thereof, a pair of cords secured at one end to said drum for winding thereon and extending outwardly and over said pulleys, and weights on the outer end of each of said cords providing for the application of balanced torque to said drum to rotate said shaft and rotatable member within said container.

CARSTEN C. STEFFENS.

REFERENCES CITED

The following references are of record in the file of this patent:

UNITED STATES PATENTS

| Number | Name | Date |
|---|---|---|
| 1,893,749 | Klopsteg | Jan. 10, 1933 |
| 1,944,983 | Kampf | Jan. 30, 1934 |
| 2,074,174 | Goodier | Mar. 16, 1937 |
| 2,365,339 | Green | Dec. 19, 1944 |
| 2,410,385 | Loukomsky et al. | Oct. 29, 1946 |